United States Patent
Diaz Parrilla et al.

(10) Patent No.: US 10,481,040 B2
(45) Date of Patent: Nov. 19, 2019

(54) BOUNDARY LAYER SUCTION SYSTEM

(71) Applicant: Airbus Operations, S.L., Getafe (ES)

(72) Inventors: José Maria Diaz Parrilla, Getafe (ES); Álvaro Jara Rodelgo, Getafe (ES); Miguel Ángel Gallego Lorenzo, Getafe (ES); José Ángel Hernanz Manrique, Getafe (ES)

(73) Assignee: AIRBUS OPERATIONS S.L., Getafe (ES)

( * ) Notice: Subject to any disclaimer, the term of this patent is extended or adjusted under 35 U.S.C. 154(b) by 335 days.

(21) Appl. No.: 15/215,768

(22) Filed: Jul. 21, 2016

(65) Prior Publication Data

US 2017/0023437 A1    Jan. 26, 2017

(30) Foreign Application Priority Data

Jul. 21, 2015 (EP) ..................... 15382377

(51) Int. Cl.
*G01M 9/04* (2006.01)
*B64F 5/60* (2017.01)

(52) U.S. Cl.
CPC ............... *G01M 9/04* (2013.01); *B64F 5/60* (2017.01)

(58) Field of Classification Search
CPC ............ G01M 9/00; G01M 9/02; G01M 9/04; G01M 9/06; B64F 5/60
USPC .................... 73/118.01, 118.03, 147, 170.02
See application file for complete search history.

(56) References Cited

U.S. PATENT DOCUMENTS

| | | | | |
|---|---|---|---|---|
| 2,588,840 | A * | 3/1952 | Howland | G01K 13/02 338/25 |
| 2,709,917 | A | 6/1955 | Hendrik | |
| 3,016,745 | A * | 1/1962 | Simon | G01K 13/02 136/231 |
| 5,099,685 | A | 3/1992 | McLean et al. | |
| 2008/0285620 | A1* | 11/2008 | Benning | G01K 13/02 374/138 |

(Continued)

FOREIGN PATENT DOCUMENTS

| | | |
|---|---|---|
| DE | 10037928 | 4/2001 |
| EP | 0515278 | 11/1992 |

(Continued)

OTHER PUBLICATIONS

European Search Report, Jan. 12, 2016, priority document.
"Optimal disturbances in suction boundary layers", Bystrom et al. Feb. 28, 2007.

*Primary Examiner* — Benjamin R Schmitt
(74) *Attorney, Agent, or Firm* — Greer, Burns & Crain, Ltd.

(57) ABSTRACT

A boundary layer suction system adapted to a surface exposed to the circulation of a fluid. The system comprises a portion of the surface, a bifurcation element for bifurcating a mass of fluid flowing along the front face of the surface, comprising an airfoil-shaped cross-section such that the fluid is bifurcated into a first and a second flow, a slot located on the portion of the surface and downstream of the leading edge of the bifurcation element, the slot communicating the front and the rear faces of the portion of the surface, and an arrangement to provide a pressure difference between the front and the rear faces of the surface around the slot, such that a suction of the boundary layer is performed through the slot by the pressure difference.

9 Claims, 2 Drawing Sheets

(56) References Cited

U.S. PATENT DOCUMENTS

2010/0044522 A1* 2/2010 Siercke .................. B60H 1/26
                                                            244/53 B
2015/0307202 A1* 10/2015 Crouch ................. B64D 43/00
                                                            73/147

FOREIGN PATENT DOCUMENTS

EP        2098848      9/2009
WO     2009025578    2/2009

* cited by examiner

BOUNDARY LAYER SUCTION SYSTEM

CROSS-REFERENCES TO RELATED APPLICATIONS

This application claims the benefit of the European patent application No. 15382377.8 filed on Jul. 21, 2015, the entire disclosures of which are incorporated herein by way of reference.

FIELD OF THE INVENTION

The present invention relates to a suction system to blow away a boundary layer developed along a surface exposed to the circulation of a fluid in order to improve the quality of the flow. Particularly, the suction system is indicated for a boundary layer developed along the walls of a wind tunnel.

BACKGROUND OF THE INVENTION

In general, wind tunnels are used to study the airflow around objects or to measure aerodynamic properties of objects. As qualitative studies and quantitative measurements on airflows are very complicated in real aircraft conditions, these conditions are simulated in a wind tunnel. This means that the object of study is located in the test section of the wind tunnel in a fixed or limited position on a wind axis and the air is the element which moves around through this test section while aerodynamic effects are measured.

During testing, a thin layer of air close to the walls of the wind tunnel is decelerated compared to the main airstream velocity due to friction between the airflow through the tunnel and the wind tunnel walls. This layer of air is called the boundary layer. The amount of deceleration in the boundary layer can be expressed as a momentum loss. Boundary layers on wind tunnel walls have an influence on the wind tunnel measurements as they are not present in real conditions. Therefore, boundary layers cause a difference between wind tunnel measurements and real aircraft conditions measurements. This is why boundary layer effect in wind tunnels should be minimized as much as possible.

In the state of the art the following solutions for removing a boundary layer of a wind tunnel are known.

Locating a suction system of a porous or perforated section in the ground plane upstream of the model, where a certain portion of the boundary layer flow is removed by the action of pressure pumps which are in communication with the boundary layer at the wind tunnel wall and which are connected to suction device(s) by means of one or more suction ducts. The air sucked out of the wind tunnel by the suction system can be re-injected in the wind tunnel behind the measurement section.

It is also known an apparatus for sucking of near-wall air boundary layer from a flow which is led to a wall moved in parallel with the flow and delimiting the flow, which is formed by an endless belt guided around a roll, wherein in the return area of roll a suction device is arranged. The apparatus consists of a suction box provided with suction channel and of a suction plate which is provided with passage openings running perpendicular to the direction of flow and is arranged at the level of the moved wall, wherein the suction plate is laterally connected with the suction box. The suction plate bridges the space between the roll and front side of the suction box, that front edge of the suction plate is rounded and that, seen in radial direction of the roll, a distance of about 5 mm is maintained between the rounded front edge of the suction plate and the circumference of the roll.

SUMMARY OF THE INVENTION

The invention relates to a suction system to blow away the boundary layer developed along a surface exposed to the circulation of a fluid by using a pressure difference between the front face of the surface which is exposed to the flow and its rear face. The invention is particularly advantageous in its application in wind tunnels being in this case therefore decisive the pressure difference between the inside and outside of the wind tunnel.

The system is configured for being adapted to a surface exposed to the circulation of a fluid, the system comprising a portion of the surface having a front and a rear face and further comprising:
- a bifurcation element configured for bifurcating a mass of fluid flowing along the front face of the surface, the bifurcation element comprising an airfoil-shaped cross-section such that the fluid is bifurcated into a first and a second flow, the first flow being movable between the bifurcation element and the surface,
- a slot located on the portion of the surface and downstream the leading edge of the bifurcation element, the slot providing communication between the front and the rear faces of the portion of the surface,
- means for providing a pressure difference between the front and the rear faces of the surface around the slot such that a suction of the boundary layer is performed through the slot by the pressure difference.

The system therefore comprises an airfoil-shaped bifurcation element which drives the boundary layer flow to a slot opened on the exposed surface, for instance, the wind tunnel walls. The system could be placed mounted on a fairing in one of the wind tunnel walls. Suction of the boundary layer would be driven by the pressure difference between the inside and outside of the wind tunnel.

A new boundary layer would be developed for the second bifurcated flow along the airfoil shape of the bifurcating element.

The suction system object of the invention offers the possibility of achieving the following advantages:
Simplicity of the system as it is not needed any complex installation such as a pressure pump or some other turbo-machinery system to carry out the suction. Moreover, it is not necessary to make any change in the exposed surface but the slot. Additionally, in the application of the invention in wind tunnels which usually have removable wall areas in the test section, it allows the easy replacement of the walls of the test section with walls having the slot of the invention.
Control over the resulting boundary layer thickness, first of all because of the suction of all previous boundary layers created along the surface and secondly by modifying the shape of the bifurcation element to obtain a desired boundary layer thickness.
Suction of large boundary layer thickness. In the case of tunnel tests, the boundary layer developed on the walls may interact with the model test, which interferes with the results. To avoid this phenomenon, a safety distance is kept between the model to be tested and the tunnel walls. The present invention could reduce the distance, thus increasing the size of the model and reducing the size of the boundary layer.

The claimed invention has also an application in any situation where it is highly desirable to remove very developed boundary layers in order to improve the quality of the flow. For instance, some aircraft applications could install it:

- prior to the auxiliary power unit (APU) air intake located on the rear part of the fuselage. At this area, the boundary layer on the fuselage is quite thick, so the performance of the air intake could drop as a consequence of sucking low speed flow from the boundary layer. In this case, the boundary layer could be removed and so increase the air intake performance,
- prior to the environmental control system (ECS) air intakes located on the belly fairing,
- prior to an area where laminar flow is desired.

BRIEF DESCRIPTION OF THE DRAWINGS

To complete the description and in order to provide for a better understanding of the invention, a set of drawings is provided. The drawings form an integral part of the description and illustrate preferred embodiments of the invention. The drawings comprise the following figures.

DETAILED DESCRIPTION OF THE PREFERRED EMBODIMENTS

Figure 1:
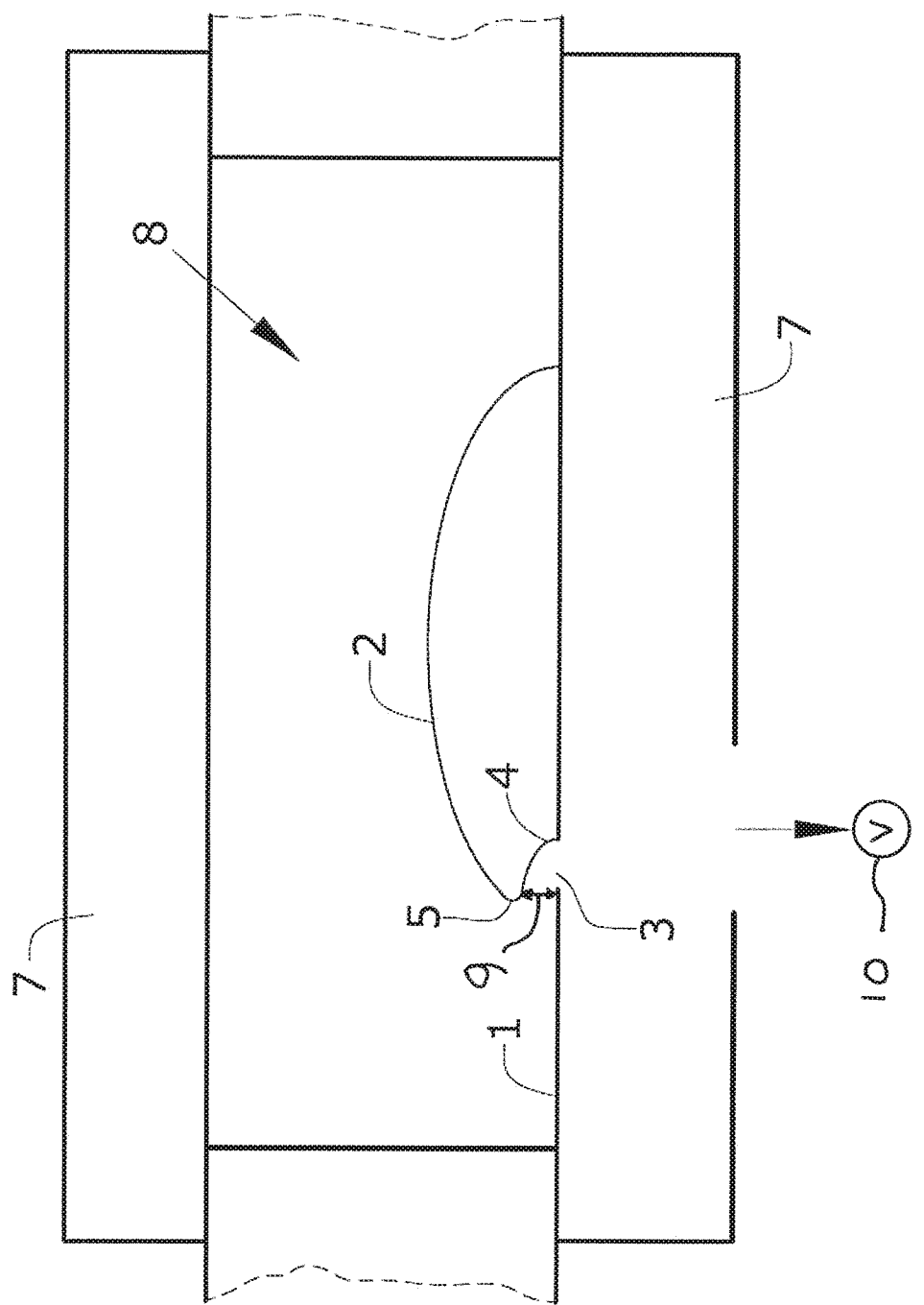
FIG. 1 shows a cross-section of a schematic representation of an embodiment of the invention applied to a wind tunnel.
Figure 2:
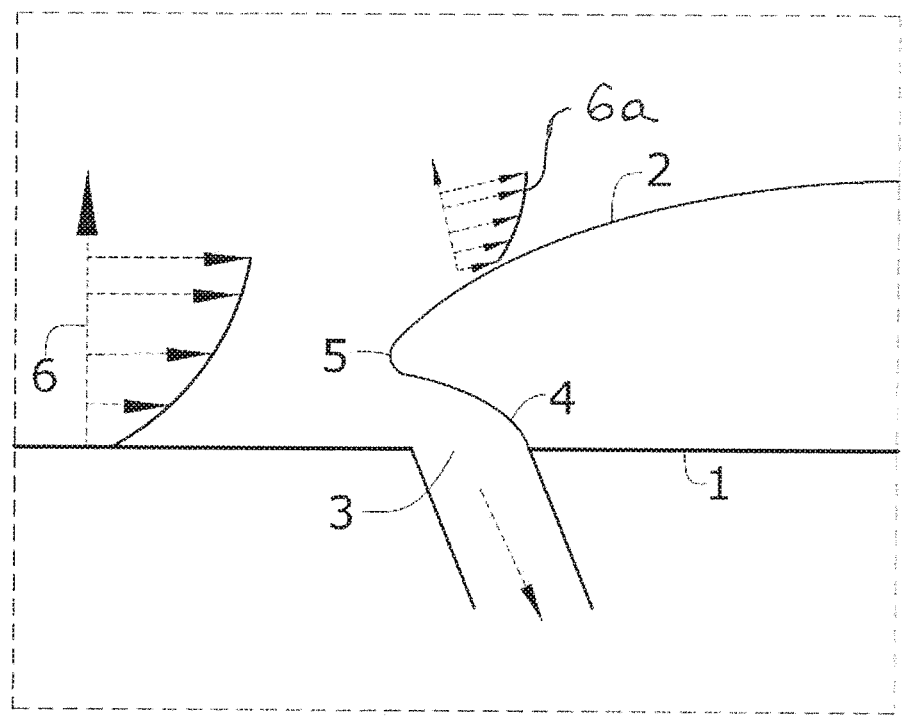
FIG. 2 shows schematically the operation of the embodiment of FIG. 1.

FIG. 2 shows a boundary layer (6) and an embodiment of the system for sucking the boundary layer (6) which is also shown in FIG. 1. The system is configured for being adapted to a surface (1) exposed to the circulation of a fluid, for instance a wall of a wind tunnel (8). The system comprises a portion of the surface (1) which in turn comprises the slot (3) located downstream of the leading edge (5) of the bifurcation element (2).

The bifurcation element (2) splits the coming flow into the first and the second flow, the first flow moving between the bifurcation element (2) and the front face of the surface (1) and the second flow flowing over the other surface of the bifurcation element (2) such that a new boundary layer is formed. Then, by modifying wind tunnel (8) conditions and the shape of the bifurcation element (2), a desired boundary layer (6a) will develop.

The bifurcation element (2) comprises an airfoil-shaped cross-section, therefore not affecting the conditions of the main stream of the wind tunnel (8). More specifically, the bifurcation element (2) comprises a rounded leading edge (5). The rounded leading edge (5) has the advantage that, under certain conditions of the wind tunnel (8), a new boundary layer according to the interests of the tests can be developed.

In the embodiment shown in the figures, the wall (4) of the bifurcation element (2) closer to the wall of the wind tunnel (8) extends until the end of the slot (3) for guiding the mass of air towards the slot (3). More specifically, a distance (9) between the leading edge (5) and the surface (1) is the thickness of the boundary layer to be sucked (6).

The slot (3) communicating between the inside and the outside of the wind tunnel (8) provides a suction of the boundary layer (6) by the pressure difference between the inside and the outside.

The system comprises means (2) for providing the pressure difference between the front and the rear faces of the surface (1) around the slot (3) the means increasing the pressure of the flowing fluid in the front face such that it is greater than the pressure of the fluid in the rear face.

Additionally, the system could comprise means (10) for decreasing the pressure of the flowing fluid in the rear face such that it is lower than the pressure of the fluid in the front face, including any well-known devices such as air moving devices or vacuum sources.

In case of a pressurized wind tunnel (8), the pressure inside the wind tunnel (8) is greater than outside, i.e., atmospheric pressure. When the test is carried out in a pressurized wind tunnel (8), the boundary layer (6) suction takes place with no external means as a pressure difference already exists.

As an alternative, the wind tunnel (8) could comprise a chamber (7) that encloses the section of the wind tunnel (8) comprising the slot (3), the chamber (7) comprising means (10) for decreasing the pressure of the fluid inside the chamber (7) and outside the wind tunnel (8), such that the pressure in the chamber (7) is lower than the pressure of the fluid in the interior of the wind tunnel (8).

There is the possibility of re-injecting the sucked mass flow to not modify the wind tunnel (1) global properties.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A boundary layer suction system configured for being adapted to a surface exposed to the circulation of a fluid, the system comprising:
    a portion of said surface having a front and a rear face,
    a bifurcation element configured for bifurcating a mass of fluid flowing along the front face of the surface, said bifurcation element comprising an airfoil-shaped cross-section such that the fluid is bifurcated into a first and a second flow, the first flow being movable between the bifurcation element and the surface,
    a slot having an opening in the portion of the surface, wherein the opening is located at the portion of the surface downstream of a leading edge of the bifurcation element, the slot providing communication between the front and the rear faces of the portion of the surface, and
    means for providing a pressure difference between the front and the rear faces of the surface around the slot such that a suction of the boundary layer is performed through the opening by said pressure difference,
    wherein a wall of the bifurcation element extends towards the front face of the surface exposed to the flow and terminates at a downstream portion of the opening of the slot whereby the flow of a mass of fluid is guided through the opening and into the slot.

2. The boundary layer suction system, according to claim 1, wherein the bifurcation element comprises a rounded leading edge.

3. The boundary layer suction system, according to claim 1, wherein a distance between the leading edge and the surface is a thickness of the boundary layer to be sucked.

4. The boundary layer suction system, according to claim 1, wherein the means for providing the pressure difference between the front and the rear faces of the surface around the slot comprises a device for increasing the pressure of the flowing fluid in the front face such that it is greater than the pressure of the fluid in the rear face.

5. The boundary layer suction system, according to claim 1, wherein the means for providing the pressure difference between the front and the rear faces of the surface around the slot comprises a device for decreasing the pressure of the fluid at the rear face such that the pressure at the rear face is lower than the pressure of the fluid in the front face.

6. A wind tunnel comprising the boundary layer suction system according to claim 1.

7. The wind tunnel, according to claim 6, further comprising means for increasing the pressure of the flowing fluid in the wind tunnel such that the pressure in the wind tunnel is greater than the pressure of the fluid at the exterior of the wind tunnel.

8. The wind tunnel, according to claim 7, wherein the wind tunnel is pressurized.

9. The wind tunnel, according to claim 7, further comprising a chamber that encloses the section of the wind tunnel comprising the slot, said chamber comprising means for decreasing the pressure of the fluid outside the wind tunnel such that the pressure outside the wind tunnel is lower than the pressure of the fluid in the interior of the wind tunnel.

\* \* \* \* \*